United States Patent
Lee et al.

(10) Patent No.: US 9,504,355 B2
(45) Date of Patent: Nov. 29, 2016

(54) FOLDABLE SPLATTER SCREEN

(71) Applicant: Robinson Home Products Inc., Williamsville, NY (US)

(72) Inventors: Stuart Harvey Lee, Forest Hills, NY (US); Jochen Schaepers, New York, NY (US)

(73) Assignee: Robinson Home Products Inc., Williamsville, NY (US)

( * ) Notice: Subject to any disclaimer, the term of this patent is extended or adjusted under 35 U.S.C. 154(b) by 47 days.

(21) Appl. No.: 14/188,369

(22) Filed: Feb. 24, 2014

(65) Prior Publication Data

US 2014/0246437 A1 Sep. 4, 2014

Related U.S. Application Data

(60) Provisional application No. 61/771,705, filed on Mar. 1, 2013.

(51) Int. Cl.
*A47J 36/06* (2006.01)
*A47J 37/10* (2006.01)
*B65D 43/02* (2006.01)

(52) U.S. Cl.
CPC .................................. *A47J 37/101* (2013.01)

(58) Field of Classification Search
CPC ........ A47J 37/101; A47J 37/108; A47J 36/06
USPC ..................................... 220/370, 731; D7/354
See application file for complete search history.

(56) References Cited

U.S. PATENT DOCUMENTS

| | | | |
|---|---|---|---|
| 1,107,987 A * | 8/1914 | Nash | A47J 37/10 99/424 |
| 1,830,230 A * | 11/1931 | Kingsley | 248/127 |
| 2,498,534 A | 2/1950 | Drum | |
| 2,770,389 A * | 11/1956 | Drakoff | 99/341 |
| 2,820,513 A * | 1/1958 | Drakoff | 55/422 |
| 3,452,895 A * | 7/1969 | Kalkowski | 220/370 |
| 5,992,675 A | 11/1999 | Kerr | |
| 6,056,146 A | 5/2000 | Varakian et al. | |
| 6,065,394 A * | 5/2000 | Gelderman | A47J 37/10 99/424 |
| D494,427 S | 8/2004 | Kaposi et al. | |
| 6,789,792 B1 * | 9/2004 | Angland | A47J 47/005 269/289 R |
| 6,971,644 B1 * | 12/2005 | Kennedy | A47J 47/005 269/289 R |
| 6,994,335 B2 * | 2/2006 | Porchia | A47J 47/005 269/289 R |
| D567,597 S | 4/2008 | Shamoon | |
| D621,217 S * | 8/2010 | Zemel | D7/408 |
| 8,096,437 B1 * | 1/2012 | Ryan | 220/370 |
| D678,719 S | 3/2013 | Ortiz | |
| 2008/0272124 A1 * | 11/2008 | Shamoon | 220/370 |
| 2010/0133142 A1 * | 6/2010 | Avery | A21B 3/131 206/557 |
| 2013/0025469 A1 * | 1/2013 | Cloutier et al. | 99/352 |
| 2015/0182069 A1 * | 7/2015 | Zaczyk | A47J 36/06 220/369 |

* cited by examiner

*Primary Examiner* — J. Gregory Pickett
*Assistant Examiner* — Niki M Eloshway
(74) *Attorney, Agent, or Firm* — Florek & Endres PLLC

(57) ABSTRACT

A splatter screen comprising a planar member having a plurality of openings, the planar member including a first hinge dividing a first portion of the planar member and a second portion of the planar member, wherein the first hinge provides for the second portion to pivot relative to the first portion from a planer configuration to a folded configuration, the first hinge located between 10% and 40% of the distance from a first edge of the planar member to a second edge of the planar member opposite the first edge to form the second portion. The preferred splatter screen includes a second hinge separating a third portion from the first portion, to create a tri-fold splatter screen.

16 Claims, 5 Drawing Sheets

FOLDABLE SPLATTER SCREEN

FIELD OF THE INVENTION

The present invention relates to kitchen accessories, and more particularly to a splatter screen for placement on a cooking vessel to limit splatter from the vessel while cooking.

BACKGROUND OF THE INVENTION

Those familiar with cooking know that, especially when cooking foods in vessels such as pots or pans at a higher temperature, the contents of a vessel being cooked may splatter and mess the area around the vessel. This commonly occurs, for example, when cooking bacon in a frying pan or making a sauce in a pot, where the sizzling bacon grease or boiling sauce is known to splatter when the pan or pot is not covered.

For certain methods of food preparation, like frying and sautéing, the heated vessel should not be covered with a lid since it would trap the steam and yield a different result. This has led to the development of splatter screens which are often made of a frame with a screen or a membrane with small holes to allow steam to escape while limiting splatter from the vessel contents.

An example of an early splatter screen can be seen in U.S. Pat. No. 2,498,534. The splatter screen described there has a handle attached to an outer ring or frame and a shield or screen disposed within the ring.

Several variations to the splatter screen have been developed over the years, including the adaption of a splatter screen without a handle. One such adaptation is shown in U.S. Pat. No. 2,770,389, which is formed more as a cover. This patent describes a splatter screen that includes two sections, each accounting for substantially one half of the cover, that that either fold, rotate or slide on one another to open the splatter screen to the contents without removing the screen from the vessel.

A similar adaptation in the prior art is a splatter screen without a handle but having two substantially equal halves separated by a hinge down the middle. One side of the splatter screen is shown as having a flat surface and the other side having an undulating surface. See, for example, U.S. Pat. No. D621,217.

Notwithstanding the above, there is a need for a better splatter screen, which can be stored in smaller spaces and can allow the user to check on the contents of the vessel without removing the entire splatter screen.

SUMMARY OF THE INVENTION

The present invention is directed to a splatter screen comprising a planar member having a plurality of openings, the planar member including a hinge dividing a first portion of the planar member and a second portion of the planar member and providing the second portion to pivot relative to the first portion, the hinge located between 10% and 40% of the distance from an edge of the planar member to the opposed edge of the planar member.

It is preferred that the planar member of the splatter screen of the present invention includes a handle to move the device from and onto a vessel and to otherwise grasp the splatter screen.

It is also preferred that the planar member includes a second hinge, preferably parallel to the first hinge, creating a third portion of the planar member and allowing the user to pivot the third portion of the planar member in relation to the first portion of the planar member. When including the second hinge, it is preferred that the second and third portions of the planar member, outward of the central first portion, be just less than one quarter of the total width of the planar member, with the first portion being just greater than one half of the total width.

Of course, the proportions of the splatter screen with two hinges can be varied without deviating from the spirit of the invention. For example, the second and third portions of the planar member, outward of the central first portion, may be just less than one third of the total width of the planar member, with the first portion being just greater than one third of the total width. Although it has been described that the first portion is slightly greater in width than the second and third portions, this is not critical to the present invention.

The splatter screen of the present invention is preferably made of a thermoplastic elastomeric material, and most preferably a silicone based thermoplastic elastomeric material, preferably including structural components to maintain the shape of the splatter screen during use. The structural components can be areas of thickened silicone, however, it is preferred that the structural components comprise stainless steel wire or other material that provides structural integrity to maintain the shape of the splatter screen. Most preferably, the structural components generally conform to the outer edges of the handle and the first, middle section of the planar member, as well as a section of the terminal edge of the second portion (and third portion when used).

The structural components are preferably not included across the hinge(s), so that they do not interfere with the user pivoting the second and/or third portions relative to the first portion of the planar member. However, internal structural components may be included in the area of the hinge(s) to limit the pivoting of the second and/or third portion to the top side of the splatter screen. These internal structural components are preferably in the form of ribs on the bottom side of the splatter screen.

The structural ribs may be placed so that they butt against the structural component at the perimeter of the first section or may be placed across the hinge, being cut at the hinge, with one side of the rib being on the first portion and the other side being on the second (or third) portion so as to butt against one another. Of course, the internal structural elements may take any suitable form, as long as they substantially prevent the second or third portion from pivoting significantly below the plane of the first portion of the planar member.

The splatter screen may also include wings or tabs at the second and/or third portion that extend beyond the natural shape of the related member. The user may engage these wings or tabs to lift the second and/or third portion, thereby pivoting it relative to the first portion, to look into a vessel on which the splatter screen covers.

Additional structural features may also be incorporated into the splatter screen of the present invention, including cooperating elements to hold the second and/or third portions in folded relation to the first portion. The envisioned cooperating elements can be any suitable type, including hooks, snaps, clasps, clips or the like, with hooks that cooperate with corresponding hooks or hooks that cooperate with respective holes being preferred. Another featured envisioned is a hole at the terminal end of the handle for hanging the splatter screen when not in use.

BRIEF DESCRIPTION OF THE DRAWINGS

The attached drawings are intended to better illustrate a preferred embodiment of the present invention without limiting the invention in any manner whatsoever.

DETAILED DESCRIPTION OF THE PREFERRED EMBODIMENTS

Figure 1:
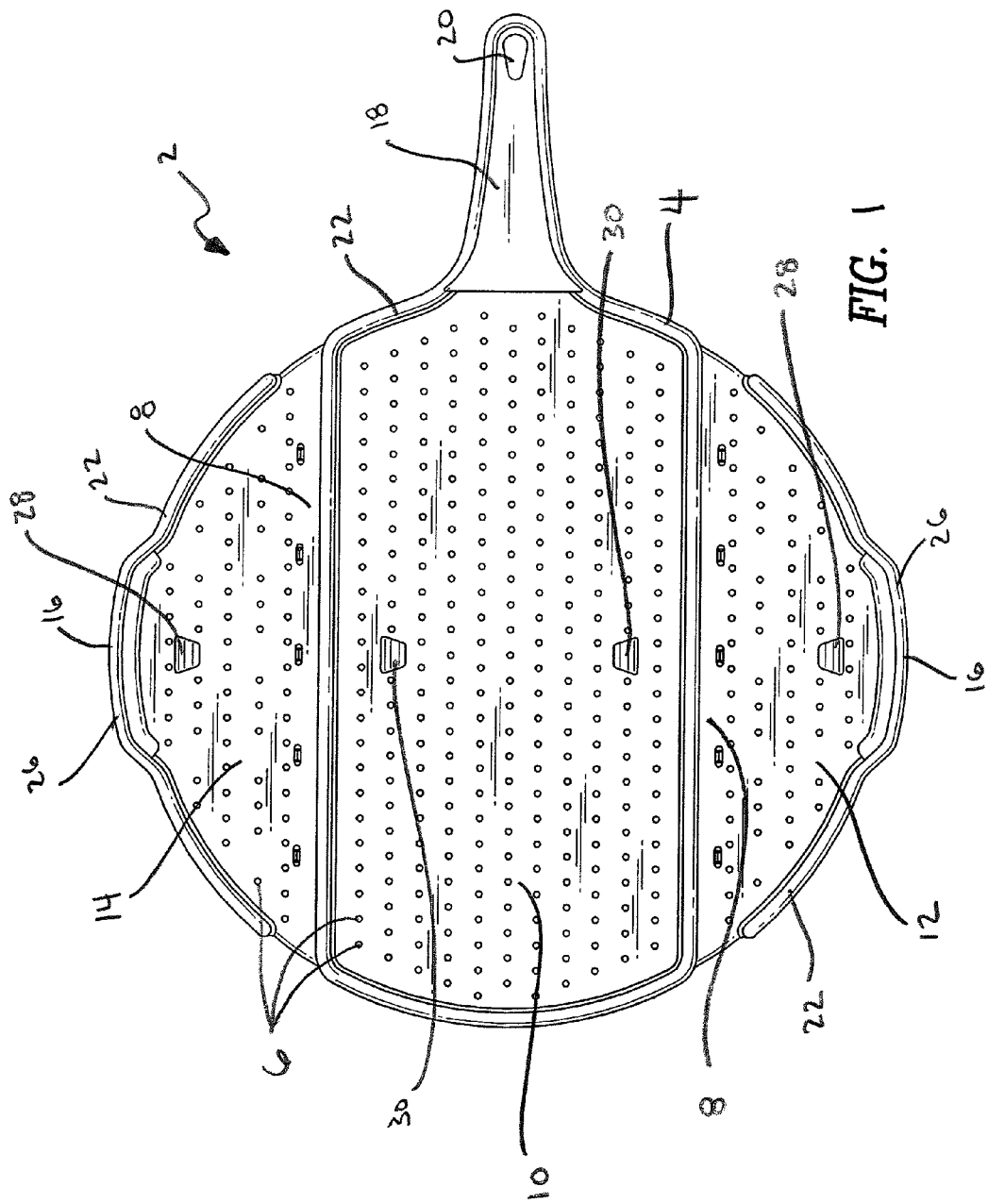
FIG. 1 is a top view of the preferred embodiment of the splatter screen of the present invention.

The following description of preferred embodiment is presented to describe the present invention and is not to be construed to limit the scope of the claims in any manner whatsoever.

As best shown in the drawings, the preferred embodiment of the present invention is directed to a splatter screen 2 comprising a planar member 4 having a plurality of openings 6, the planar member 4 including a hinge 8 dividing a first portion 10 of the planar member and a second portion 12 of the planar member 4 with a hinge 8 between the first portion 10 and second portion 12. The hinge 8 permits the second portion 12 to pivot relative to the first portion 10, and is located between 10% and 40% of the distance from an outer edge 16 of the planar member 4 to the opposed edge of the planar member 4.

Figure 6:
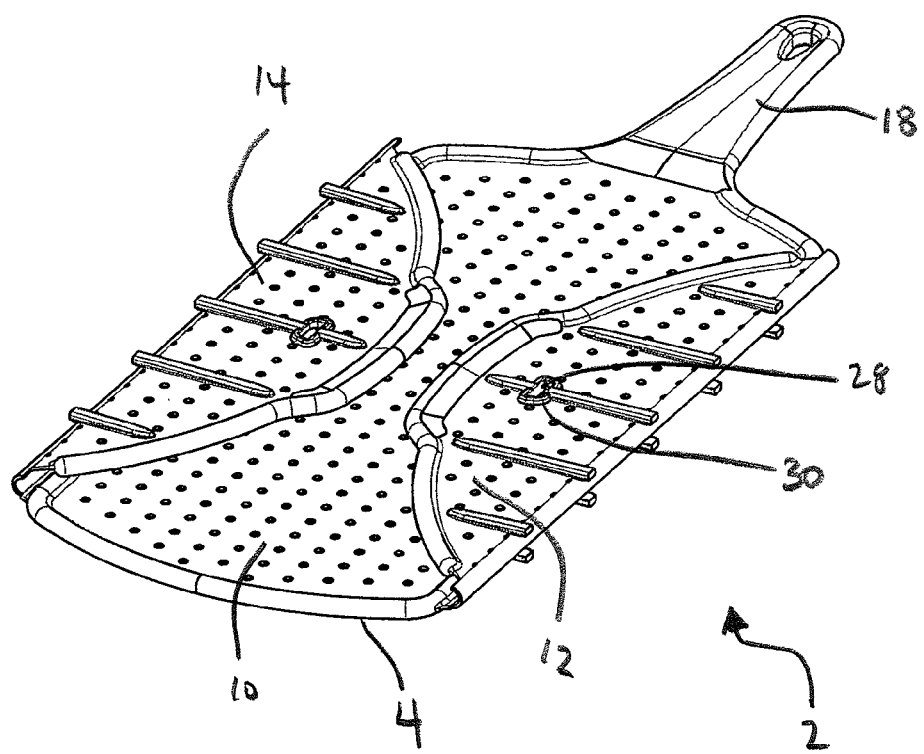
FIG. 6 is a perspective view of the preferred embodiment of the splatter screen of the present invention in a fully folded configuration.

In the preferred embodiment shown, the planar member 4 includes a second hinge 8, preferably parallel to the first hinge, creating a third portion 14 of the planar member 4 which the user can also pivot relative to first portion 10 of the planar member 4. When including the second hinge 8, it is preferred that the second portion 12 and third portion 14 of the planar member 4, be just less than one quarter of the total width of the planar member 4, with the first portion 10 being just greater than one half of the total width of the planar member 4. This permits the splatter screen 2 to be folded flat, as shown in FIG. 6, with the second portion 12 and third portion 14 resting flat on the first portion 10.

Of course, the proportions of the splatter screen 2 with two hinges 8 can be varied as determined by the designer or manufacturer. For example, the second portion 12 and third portion 14 of the planar member 4 may be just less than one third of the total width of the planar member 4, with the first portion 10 being just greater than one third of the total width. This would permit the splatter screen 2 to be folded flat with the second portion 12 and third portion 14 stacked on each other and on the first portion 10, not shown. It is understood that making at least one hinge 8 capable of folding over a double thickness would improve folding the splatter screen 2 in such an embodiment.

The preferred splatter screen 2 also includes a handle 18 extending from the planar member 10 to assist in holding and moving the splatter screen 2 onto or off of a vessel, or otherwise into or out of storage. Preferably, the handle 10 has a hole 20 at the terminal end to permit the splatter screen 2 to be hung from a hook or the like.

The preferred splatter screen 2 described here is made of high temperature resistant thermoplastic elastomer, and most preferably a silicone based thermoplastic elastomer.

Since silicone is generally a flexible material, the splatter screen 2 preferably includes structural components to maintain the shape of the splatter screen during use. For example, the preferred embodiment shown includes edge components 22 to maintain the structural integrity of the planer member 4. The edge components 22 can merely be areas of thickened silicone, however, it is preferred that the edge components 22 comprise stainless steel wire or other material that provide additional structural support to maintain the planar shape of the splatter screen 2 (see FIGS. 3 and 4).

Most preferably, the structural components of the preferred embodiment include an edge component 22 forming a unitary structure about the outer edges of the handle 18 and the first portion 10 the planar member 4, as well as a separate unit of an edge component 22 on a portion of the terminal edge of the second portion 12 and third portion 14 beyond the hinge 8. In this regard, the structural components are preferably not included across the hinges 8, so that they do not interfere with the user pivoting the second portion 12 and/or third portion 14 relative to the first portion 10 of the planar member 2.

Figure 3:
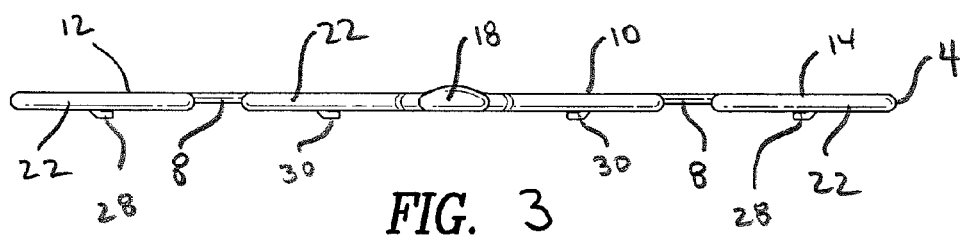
FIG. 3 is a front view, from the handle end, of the preferred embodiment of the splatter screen of the present invention.
Figure 4:
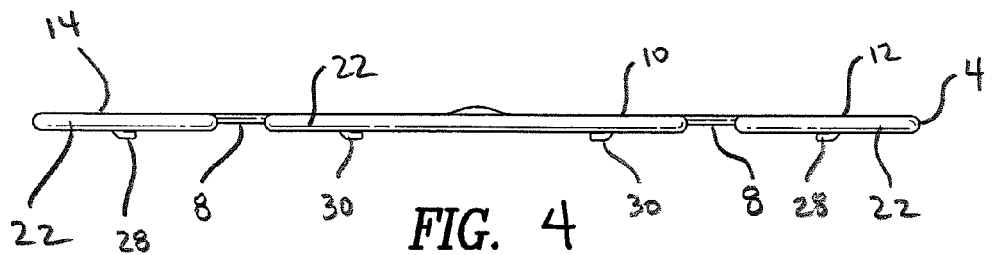
FIG. 4 is a back view of the preferred embodiment of the splatter screen of the present invention.
Figure 5:
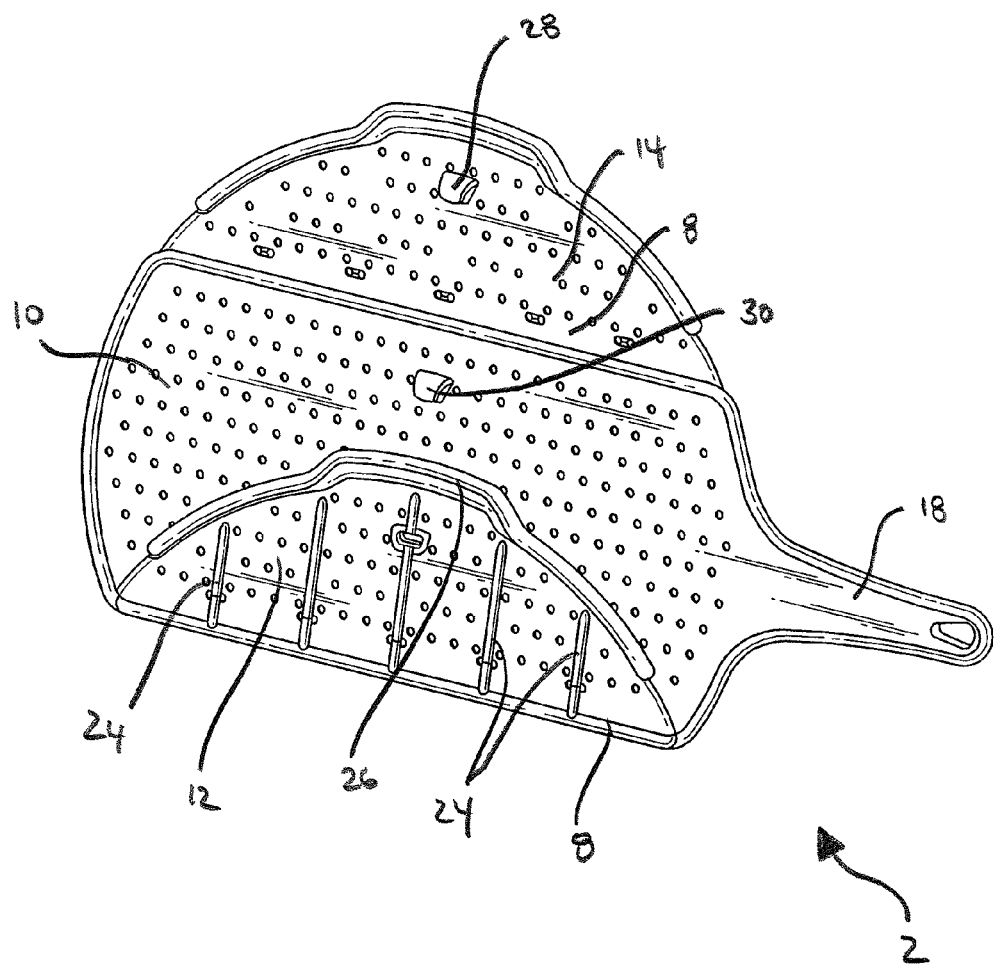
FIG. 5 is a perspective view of the preferred embodiment of the splatter screen of the present invention in a partially folded configuration.

It is also preferred that the planar member 4 have internal structural components in the area of the hinges to limit the second portion 12 and/or third portion 14 of the splatter screen 2 from pivoting substantially below the plane of the first portion 10 (see FIGS. 3 and 4). These internal structural components are preferably in the form of ribs 24 on the bottom side of the splatter screen, best seen in FIG. 2.

Figure 2:
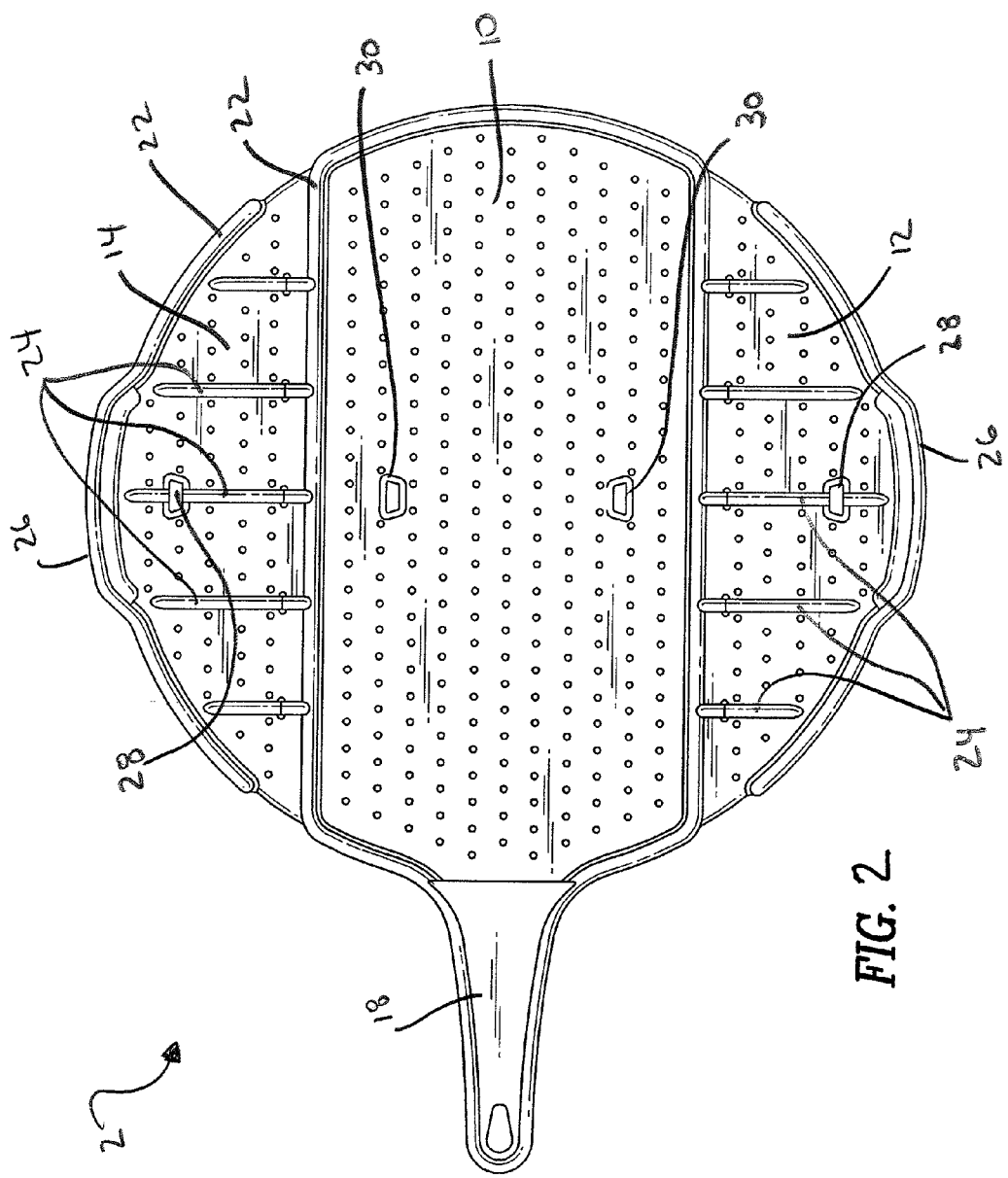
FIG. 2 is a bottom view of the preferred embodiment of the splatter screen of the present invention.

The ribs 24 is preferably be placed so that they butt against the edge component 22 at the perimeter of the first section 10, as shown in FIG. 2. Alternatively, the ribs 24 may be placed across the hinge (not shown), being cut at the hinge, with one side of the rib 24 being on the first portion 10 and the other side of the rib 24 being on the second portion 12 or third portion 14 so as to butt against the respective side.

Of course, the internal structural elements, identified as ribs 24 here, may take any suitable form as long as they substantially prevent the second portion 12 and/or third portion 14 from pivoting significantly below the plane of the first portion 10 of the planar member 4.

The splatter screen 2 may also include tabs 26 at the second portion 12 and/or third portion 14 that extend beyond the natural shape of the related portion of the planar member 4. The user may engage the tab 26 to lift the second portion 12 and/or third portion 14, thereby pivoting it relative to the first portion 10, to look into a vessel covered by the splatter screen 2.

The preferred splatter screen 2 shown also optionally includes cooperating elements to hold the second portion 12 and/or third portion 14 in folded relation to the first portion 10. The envisioned cooperating elements can be any suitable type, including hooks, snaps, clasps, clips or the like, with hooks that cooperate with respective holes being preferred. However, in the preferred embodiment the cooperating elements are hooks 28 that engage cooperating hooks or holes 30 to hold the splatter screen 2 in its folded configuration, as shown in FIG. 6. Of course, when hooks 28 and holes 30 are used, either element can be related to either the first portion 10 and second portion 12 or third portion 14.

Variations, modifications and alterations to the above detailed description will be apparent to those skilled in the art. All such variations, modifications and/or alternatives are intended to fall within the scope of the present invention, limited only by the appended claims. All cited patents and publications are hereby incorporated by reference.

We claim:

1. A splatter screen comprising a planar member having a plurality of openings, the planar member including a first hinge dividing a first portion of the planar member and a second portion of the planar member, wherein the first hinge provides for the second portion to pivot inwardly relative to the first portion from a planar configuration to a folded configuration, wherein the splatter screen in its folded configuration folds flat with the second portion resting flat on the first portion, the first hinge located between 10% and 40% of the distance from a first edge of the planar member to a second edge of the planar member opposite the first edge to form the second portion, and further wherein the planar member further comprises a structural component formed substantially about the outer edge of the first portion and optionally about the outer edge of the second portion and the second portion further comprises a stop in the form of at least a portion of one or more ribs that abut the structural component formed substantially about the outer edge of the first portion to limit pivoting of the second portion substantially below the plane of the first portion.

2. The splatter screen of claim 1 wherein the first portion comprises a handle.

3. The splatter screen of claim 2 wherein the planar member further comprises a structural component formed substantially about the perimeter of the first portion and the handle.

4. The splatter screen of claim 1 further comprising a second hinge dividing the first portion and a third portion of the planar member, the third portion being on a side of the first portion opposite the second portion, the second hinge permitting the third portion to pivot inwardly relative to the first portion from a planar configuration to a folded configuration.

5. The splatter screen of claim 4 wherein the second hinge is substantially parallel to the first hinge.

6. The splatter screen of claim 1 wherein the planar member comprises a silicone based high temperature resistant thermoplastic elastomeric material.

7. The splatter screen of claim 1 wherein the structural component is taken from the group consisting of thickened silicone based high temperature resistant thermoplastic elastomeric material, wire and stainless steel wire.

8. The splatter screen of claim 1 further comprising an extension on the second portion to aid in manipulating the second portion relative to the first portion.

9. The splatter screen of claim 1 further comprising cooperating members on the first portion and the second portion to hold the first portion and the second portion in the folded configuration.

10. A splatter screen comprising a planar member having a plurality of openings, the planar member including a first hinge, wherein the first hinge divides a first portion of the planar member and a second portion of the planar member and provides for the second portion to pivot inwardly relative to the first portion from a planar configuration to a folded configuration, the first hinge located between 10% and 40% of the distance from a first edge of the planar member to a second edge opposite the first edge to form the second portion, and a second hinge, wherein the second hinge divides a first portion of the planar member and a third portion of the planar member and provides for the third portion to pivot inwardly relative to the first portion from a planar configuration to a folded configuration, the second hinge located between 10% and 40% of the distance from the second edge of the planar member to the first edge of the planar member to form the third portion, wherein the splatter screen in its folded configuration folds flat with at least one of the second portion and the third portion resting flat on the first portion, and further wherein the planar member further comprises a structural component formed substantially about the outer edge of the first portion and optionally about the outer edge of the second portion and third portion and the second portion and third portion further comprise a stop in the form of at least a portion of one or more ribs that abut the structural component formed substantially about the outer edge of the first portion to limit pivoting of the second portion and third portion substantially below the plane of the first portion.

11. The splatter screen of claim 10 wherein the first portion comprises a handle.

12. The splatter screen of claim 10 wherein the second hinge is substantially parallel to the first hinge.

13. The splatter screen of claim 10 wherein the planar member comprises a silicone based high temperature resistant thermoplastic elastomeric material.

14. The splatter screen of claim 10 wherein the structural component is taken from the group consisting of thickened silicone based high temperature resistant thermoplastic elastomeric material, wire and stainless steel wire.

15. The splatter screen of claim 10 further comprising an extension on at least one of the second portion and the third portion to aid in manipulating the second portion and/or the third portion relative to the first portion.

16. The splatter screen of claim 10 further comprising cooperating members on the first portion and the third portion to hold the first portion, second portion and the third portion in the folded configuration.

* * * * *